Figure 1:
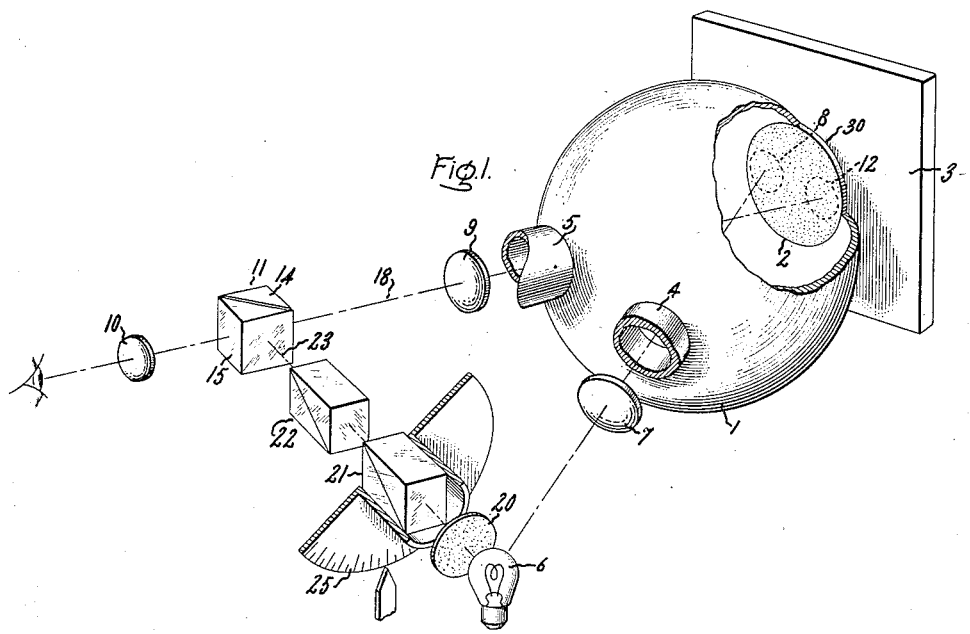

Nov. 6, 1934.  F. A. BENFORD  1,979,952

REFLECTOMETER

Filed Nov. 16, 1933

Inventor:
Frank A. Benford,
by Harry E. Dunham
His Attorney.

Patented Nov. 6, 1934

1,979,952

UNITED STATES PATENT OFFICE 1,979,952

REFLECTOMETER

Frank A. Benford, Schenectady, N. Y., assignor to General Electric Company, a corporation of New York Application November 16, 1933, Serial No. 698,279

4 Claims. (Cl. 88—23)

My invention relates to reflectometers. Of the various forms of reflectometer which have been constructed or described heretofore, some of the most approved types enable readings to be taken of the reflecting power of a test surface which are highly accurate but their accuracy always has been dependent on the condition that the test surface shall be a mat or diffusing surface. Whenever the test surface has been a specular surface an error has been introduced which may be as high as ten per cent or more; when the test surface has reflected light by a combination of mat and specular action, as most surfaces do, an error has been known to exist but the amount of the error has been entirely indeterminate. The reason that errors are introduced in the readings made with reflectometers as heretofore constructed when the test surface has been any other than a mat surface, can be explained more conveniently later in connection with the drawing illustrating my invention.

It is the object of my invention to provide an improved reflectometer which will avoid the errors mentioned above and with which correct readings may be made of the reflecting power of a surface of either type or of a surface comprising any combination of those types.

My invention will be better understood from the following description taken in connection with the accompanying drawing, and its scope will be pointed out in the appended claims.

Figure 2:
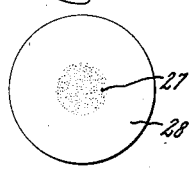

Referring to the drawing, Fig. 1 is a perspective view of an embodiment of my invention; and Fig. 2 shows the two concentric fields of view as seen by a person using the apparatus.

In Fig. 1 an integrating sphere of common form is shown at 1 having its interior surface covered with a highly reflecting white material, such as magnesium carbonate, which forms a mat surface on the interior of the sphere. At 2 is a circular aperture in the sphere which is adapted to be covered by a test surface 3 whose reflecting power is to be measured. The sphere has two other openings 4 and 5 through which light respectively is admitted to and escapes from the sphere. A suitable light source 6 in cooperation with the condensing lens 7 directs a light beam through the opening 4 to produce an illuminated spot represented by the dotted circle 8. Through an optical system comprising the objective 9, the eye piece lens 10 and the photometric cube 11 one observes the illumination of a certain area represented by the dotted circle 12. While I have chosen to show the apparatus so constructed that both the illuminated spot 8 and the observed area 12 are arranged at the aperture 2, the construction may if desired be such that either one or both are arranged at some point on the interior surface of the sphere other than at the aperture.

The photometric cube 11 may, for example, be a Lummer-Brodhun cube but since the construction and use of such a cube are well known a detailed description of the cube need not be given.

In order to compare the light received from the sphere and following the dot-and-dash line 18 with a standard of light an optical system is provided comprising the diffusing screen 20 and the two polarizing prisms 21 and 22 arranged between the lamp 6 and the cube 11 whereby a light beam represented by the dot-and-dash line 23 from the lamp is directed into the cube in a direction at right angles to that of line 18. Prism 21 is shown provided with the scale 25 and is rotatably mounted whereby the amount of light which passes the two prisms may be varied in the well known manner. In accordance with the well known use of the photometric cube the field of view as seen by the observer may be as represented by Fig. 2 where the light from the sphere illuminates the central zone 27 and the light received directly from the lamp 6 illuminates the surrounding zone 28. By adjusting prism 21 angularly until both zones appear to have the same illumination one may take a reading from the scale 25 of the reflecting power of the test surface 3.

In the introductory portion of this specification I pointed out that the former reflectometers were accurate only when the test surface was a mat surface and stated that the reason for the errors could be explained better with the aid of the drawing. In order that the reflectometer which I have devised shall be accurate when the test surface is either a mat and specular surface or any combination thereof I have provided the sphere with the translucent diffusing member 30 through which the light which is reflected from the test surface into the sphere must pass. Member 30 may be arranged either within or without the sphere so as to cover the aperture and may be constructed of a variety of materials. Preferably it is a disk of acid etched glass which fits in the aperture as illustrated. Referring now to Fig. 1 for an explanation of why the apparatus which I have devised is accurate for both mat and specular surfaces, let it be assumed that the disk 30 is omitted. If the test surface 3 is a mat or diffusing surface, light from the spot 8 will illuminate substantially equally all portions of the interior mat surface of the sphere in accordance with the well known law governing the operation of an integrating sphere and hence by the first complete reflection will reach the spot 12 which is the portion of surface 3 viewed by the observer. The brightness of the latter spot is an indirect measure of the coefficient of reflection of the test surface. If on the other hand the test surface is a mirror, light from the spot 8 is reflected as a beam on a small area on the opposite side of the sphere. The interior of the sphere therefore is unevenly illuminated by the mirror and the brightness of the observed spot 12 depends not only upon the quantity of light reflected by the test surface but also upon the manner in which it is reflected. This difficulty is a well recognized one and the most accurate reflectometer available at the present time is called a "diffuse" reflectometer because it is known to be accurate only for diffuse surfaces. By providing the translucent diffusing member 30 at the aperture it will be seen that the light passing through the aperture and returning is diffused in substantially the same manner for all types of reflecting surfaces. The sphere therefore receives only diffused light from the test surface regardless of whether the latter is a mat or a specular surface. I have found by actual measurement using for test surfaces mirrors having coefficients of reflection of 0.916, 0.56 and 0.09 that with the above described reflectometer the results are without detectable error. Since the instrument is accurate for the extreme types of surfaces it is accurate for all intermediate types and for all combinations thereof.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States is:

1. A reflectometer comprising an integrating sphere having an aperture adapted to be covered by a test surface and having means by which light may be introduced thereinto and may escape therefrom, means for comparing light received from said sphere and light from another source and means for diffusing the light reflected into said aperture by a test surface.

2. A reflectometer comprising an integrating sphere having an aperture adapted to be covered by a test surface and having means by which light may be introduced thereinto and may escape therefrom, means for comparing light received from said sphere and light from another source and a translucent diffusing medium at said aperture through which passes the light reflected into the sphere from a test surface.

3. A reflectometer comprising an integrating sphere having an aperture adapted to be covered by a test surface and having means by which light may pass thereinto and may escape therefrom, means for comparing light received from said sphere and light from another source and a translucent diffusing member arranged in and filling said aperture.

4. A reflectometer comprising an integrating sphere having an aperture adapted to be covered by a test surface and having means by which light may be introduced thereinto and may escape therefrom, a light source arranged to direct light into said sphere, means for comparing the light received from the sphere with the light received from said source independently of the sphere and means arranged to diffuse the light reflected back into the sphere through said aperture.

FRANK A. BENFORD.